United States Patent

Dach et al.

[11] Patent Number: 5,449,451
[45] Date of Patent: Sep. 12, 1995

[54] FLUID CATALYTIC CRACKING FEEDSTOCK INJECTION PROCESS

[75] Inventors: Michael M. Dach, Houston; Henry C. Chan, Bellaire; Ting Y. Chan, Houston, all of Tex.

[73] Assignee: Texaco Inc., White Plains, N.Y.

[21] Appl. No.: 126,842

[22] Filed: Sep. 20, 1993

[51] Int. Cl.⁶ ............................................. C10G 11/02
[52] U.S. Cl. ................................. 208/113; 208/153; 208/157
[58] Field of Search ............... 208/120, 113, 153, 157

[56] References Cited

U.S. PATENT DOCUMENTS

| | | | |
|---|---|---|---|
| 2,518,116 | 8/1950 | Bete | 299/121 |
| 2,747,936 | 5/1956 | Wahlin | 299/114 |
| 3,974,062 | 8/1976 | Owen et al. | 208/120 |
| 4,002,557 | 1/1977 | Owen et al. | 208/120 |
| 4,035,285 | 7/1977 | Owen et al. | 208/120 |
| 4,066,531 | 1/1978 | Owen et al. | 208/120 |
| 4,090,949 | 5/1978 | Owen et al. | 208/78 |
| 4,514,291 | 4/1985 | McGarry et al. | 208/166 |
| 4,883,583 | 11/1989 | Mauléon et al. | 208/113 |

Primary Examiner—Helane Myers
Attorney, Agent, or Firm—James L. Bailey; Kenneth R. Priem; Richard A. Morgan

[57] ABSTRACT

The invention is a method for mixing feedstock with fluidized catalyst in a fluid catalytic cracking (FCC) riser reactor. A dispersed catalyst suspension is passed upwardly at a velocity of 0.5 to 4 ft/sec. Atomized feedstock is injected downwardly at a velocity of −30 to −1000 ft./sec to produce a turbulently mixed reaction suspension. Vaporizing feedstock rapidly accelerates the reaction suspension in approximately plug flow. The slip factor between catalyst and hydrocarbon in the reaction suspension defining the departure from ideal plug flow is thereby reduced.

1 Claim, No Drawings

FLUID CATALYTIC CRACKING FEEDSTOCK INJECTION PROCESS

BACKGROUND OF THE INVENTION

1. Field of the Invention

This invention relates to a fluid catalytic cracking (FCC) process for converting petroleum derived hydrocarbon feedstocks to liquid boiling range products. The invention more particularly relates to a method of combining feedstock with catalyst to improve flow characteristics in a fluid catalytic (FCC) riser reactor.

2. Other Related Methods In the Field

Fluid catalytic cracking processes are well known in the art. In the catalytic cracking process, liquid hydrocarbon feedstocks such as diesel, gas oil, vacuum gas oil, atmospheric residuum, deasphalted oil and combinations thereof are contacted with active cracking catalysts such as a crystalline alumina silicate at temperatures of from about 800° F. to 1400° F., preferably 850° F. to about 1050° F. at pressures of about 20 psia to 45 psia for a period of time in the order of about 10 seconds or less, preferably about 0.5 seconds to convert the feedstock. The process utilizes pelleted catalyst in a moving bed, or powdered or microspherical catalyst in a fluidized reaction zone. There are many types of cracking catalysts. One group referred to as zeolite catalysts, are commercially preferred. Higher boiling hydrocarbons such as vacuum gas oil are cracked using zeolite catalyst to produce lower boiling hydrocarbons with the relative product mix, including $C_4$ olefins, gasoline and solid carbonaceous deposits determined by catalyst contact time, reactor conditions and feedstock composition.

The vaporization rate of liquid hydrocarbon feedstock is significant in a fluidized catalytic cracking reaction zone. With liquid feedstock, the time required for vaporization of atomized liquid droplets reduces the time available for the desired catalytic reactions thus tending to reduce feed conversion per pass with a consequent adverse influence on yield. The process can be carried out and good product yields achieved with an all vapor feedstock because the desired reactions occur in the vapor phase. Vapor phase also provides rapid transport of reactants to and from active catalytic sites which favors a high reaction rate. However, preheating the feedstock for complete vaporization prior to injection into the reactor adversely affects process economics.

Thus, it has been found that vaporization of the feedstock is critical. Essentially complete vaporization of atomized feedstock must be effected in the injection zone.

It has also been found advantageous to vaporize all feedstock in about one second or less by atomizing the liquid to form a fine dispersion of droplets of about 350 microns or less in diameter. With such a fine dispersion, all the droplets do not have to come in direct contact with the catalyst heat source for rapid vaporization. Heat flows rapidly by radiation and thermal conduction through vapor and evaporates the liquid droplets without direct contact with the catalyst.

A number of atomization nozzles have been used commercially to vaporize feedstock. The nozzle described in U.S. Pat. No. 2,747,936 to F. W. Wahlin is typical of impact plate and orifice nozzles used in the industry.

Atomization of liquid fuels is discussed in Perry's Chemical Engineer's Handbook, 4th ed., pp 9–24 to 9–27. Atomization of liquid fuels is subdivided into external atomization, internal atomization and mechanical atomization.

In external atomization, oil is atomized by hitting a flowing oil stream with a perpendicular flow of an atomizing fluid. Steam may be used as the atomizing fluid in an amount of 0.1 to 8 pounds of steam per pound of oil. Internal atomization is accomplished by mixing steam and oil together before flowing through an atomizer venturi.

Mechanical atomization is accomplished in its simplest application by forcing the oil under pressure through tangential slots in a sprayer plate to impart a rotating motion. The droplets leave the nozzle through an orifice. Droplet size is determined by the pressure drop across the sprayer plate.

Pressure drop is the primary parameter for control of droplet size in atomizers. Atomizers have been used which apply a pressure drop of 30 to 50 psi, yielding 400 to 500 micron droplets. Spiral tip atomizers have been used, e.g. U.S. Pat. 2,518,116 to J. U. Bete and U.S. Pat. No. 4,514,291 to P. E. McGarry et al. Those spiral tip nozzles apply pressure drops of 40 to 50 psi to yield 200 to 300 micron droplets.

There is a need in the art for a method to vaporize feedstock in a fluid catalytic cracking (FCC) process to achieve transport of both feedstock and catalyst together up the riser reactor in plug flow.

SUMMARY OF THE INVENTION

The invention is a fluid catalytic cracking (FCC) process carried out in a vertically elongated upflow riser reactor zone. The riser reactor zone comprises in order, a catalyst fluidization zone; a feedstock injection zone; and a feedstock reaction zone.

Particulate catalyst and a fluidizing gas are combined in a catalyst fluidization zone to form a catalyst suspension. The relative amounts of particulate catalyst and fluidizing gas gives the catalyst suspension a density of 15 to 700 kg/m$^3$. The catalyst suspension is passed upwardly to the feedstock injection zone at a velocity of 0.5 to 4 ft./sec.

In the feedstock injection zone atomized feedstock is injected into the catalyst suspension in an amount relative to the particulate catalyst to define a catalyst/hydrocarbon weight ratio of 5/1 to 40/1. Injection is downward, at a velocity relative to the catalyst suspension of −30 to −1000 ft./sec. Due to feedstock vaporizing, the resulting reaction suspension has an upward velocity of 15 to 70 ft./sec.

The reaction suspension is passed upwardly through the reaction zone at reaction conditions. Catalyst and cracked hydrocarbon products are withdrawn.

Slip ratio (S) defines the departure of the reaction suspension from ideal plug flow in the riser reactor zone according to the formula:

$$\text{Slip ratio } (S) = \frac{\text{catalyst residence time}}{\text{hydrocarbon residence time}}$$

Slip ratio (S) is maintained in the ratio of 10/1 to 1/1.

DETAILED DESCRIPTION OF THE INVENTION

The invention is a method of mixing catalyst and hydrocarbon feedstock in a fluid catalytic cracking (FCC) riser reactor. Mixing brings about contacting of hot catalyst with atomized feedstock causing essentially instantaneous vaporization. The rapidly expanding vaporized feedstock accelerates up the riser reactor carrying with it the catalyst.

It is widely recognized in modern reactor design that the most desired cracking reactors take place when the catalyst particles and feedstock contact in plug flow through the reaction zone. Slip is the term used to describe the departure from ideal plug flow of catalyst particles and hydrocarbon vapors moving upwardly together.

For any section of a riser reactor, the slip ratio (Sy) at a point y, is defined by the relative velocities by the equation:

$$Sy = \frac{Vv}{Vc}$$

wherein:
Vv = hydrocarbon vapor velocity
Vc = solid catalyst velocity

If individual point slip ratios along the entire length of the riser reactor are summed and then divided by the total number of points the result is a slip factor (S) for the entire reactor. Slip factor (S) is defined by the equation:

$$S = \sum_{o}^{n} \frac{Sy}{n} = \frac{tv}{tc}$$

wherein:
tv = vapor residence time, and
tc = catalyst particle residence time.

In the lower part of the riser reactor, catalyst particles are accelerated by faster moving hydrocarbon feedstock vapors to the final riser reactor outlet velocity. The rising catalyst particles gain energy from the hydrocarbon vapors flowing upwardly around the catalyst particles. The separation or slip between hydrogenation vapor and catalyst is greatest where the velocity difference between the two is the greatest. Slip is particularly prevalent in the initial 25 vol % to 30 vol % of the riser reactor where catalyst particles and rapidly expanding vapor are accelerating to terminal velocity.

Applicants have discovered a method of combining hydrocarbon feedstock in a fluid catalytic cracking (FCC) process. The method reduces the slip between particle catalyst and hydrocarbon feedstock in the reaction zone.

The method relies on turbulent mixing catalyst and hydrocarbon feedstock in the hydrocarbon injection zone. This is achieved by back mixing the feedstock at an injection velocity of −30 to −1000 ft./sec. relative to the catalyst suspension which is flowing upwardly relative to the riser reactor at a velocity of about 0.5 to 4 ft./sec. The momentum of the catalyst suspension is an order of magnitude greater than that of the injected feedstock. A portion of this momentum is used for turbulent mixing in both the horizontal plane and vertical plane. The result is a turbulently mixed reaction suspension.

A portion of the catalyst suspension momentum is used to cause turbulent mixing. Another portion is dissipated in reversing the flow of injected feedstock. No adverse effect in the process, has been found in this momentum loss. The momentum is used to advantage to cause mixing. That momentum had heretofore been dissipated downstream in the rough cut cyclones without benefit to the process.

The mechanism is not known with mathematical certainty. The process dissipates a portion of catalyst suspension momentum in the riser to bring about back mixing. At the same time, catalyst circulation changes from momentum driven to thermodynamics driven. The catalyst suspension is fluidized by fluidizing gas. The turbulently mixed fluidized catalyst suspension is accelerated by rapidly expanding, vaporized feedstock. At this point the feedstock vaporization is sufficient to cause flow of catalyst up the riser at a velocity approaching the vapor velocity. Backmixing is almost completely attenuated during this acceleration.

The departure from ideal plug flow on the riser reactor is qualified by the slip factor (S) defined by the equation:

$$S = \frac{t\,catalyst}{t\,hc}$$

wherein:
t catalyst = particulate catalyst residence time, and
t hc = hydrocarbon residence time.

According to the process, reaction zone slip factor is maintained in the range of 10/1 to 1/1.

The invention is carried out in a preexisting fluid catalytic cracking riser reactor. The feedstock injection nozzles are repositioned to inject feedstock downwardly into the upwardly flowing catalyst/fluidization gas mixture. Feedstock injection apparatus used in the industry includes atomization nozzles which produce 250 to 500 micron diameter droplets.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. In a fluid catalytic cracking process carried out between a hydrocarbon and a particulate catalyst in a vertically elongated riser reactor zone comprising an initial, catalyst fluidization zone, a hydrocarbon injection zone and a reaction zone comprising the steps of:

fluidizing the particulate catalyst in the catalyst fluidization zone, and passing the particulate catalyst upwardly to the hydrocarbon injection zone at a catalyst velocity of about 0.5 to 4 ft./sec., injecting the hydrocarbon into the hydrocarbon injection zone in the form of atomized droplets in a particulate catalyst/hydrocarbon weight ratio of 5/1 to 40/1 and at an injection velocity relative to the catalyst velocity of −30 ft/sec to −1000 ft/sec, passing both the particulate catalyst and the hydrocarbon upwardly through the reaction zone at reaction conditions and withdrawing the particulate catalyst and the hydrocarbon from the reaction zone thereby defining a particulate catalyst residence time (t catalyst) and a hydrocarbon residence time (t hc) in the riser reactor zone;

thereby maintaining a riser reactor zone slip ratio (S) of 10/1 to 1/1 according to the formula:

$$S = \frac{t\,catalyst}{t\,hc}.$$

* * * * *